US012718181B2

(12) United States Patent
Zhang et al.

(10) Patent No.: US 12,718,181 B2
(45) Date of Patent: Aug. 25, 2026

(54) SLACKNESS ALLOCATION FOR LOAD GENERATION

(71) Applicant: Walmart Apollo, LLC, Bentonville, AR (US)

(72) Inventors: Liqing Zhang, Humble, TX (US); Rohan Prakash, Rogers, AR (US); Nadere Mansouri, McKinney, TX (US); Ming Ni, Pflugerville, TX (US); Li Ji, Fremont, CA (US); Ti Zhang, Rocklin, CA (US); Jing Huang, San Jose, CA (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 19/042,511

(22) Filed: Jan. 31, 2025

(65) Prior Publication Data

US 2025/0245606 A1 Jul. 31, 2025

Related U.S. Application Data

(60) Provisional application No. 63/627,493, filed on Jan. 31, 2024.

(51) Int. Cl.
*G06Q 10/083* (2024.01)

(52) U.S. Cl.
CPC .................................. *G06Q 10/083* (2013.01)

(58) Field of Classification Search
CPC .................................................... G06Q 10/083
USPC .......................................................... 705/337
See application file for complete search history.

(56) References Cited

U.S. PATENT DOCUMENTS

2006/0241822 A1 10/2006 Yadappanavar et al.
2013/0159206 A1 6/2013 Barahona et al.
2014/0310049 A1 10/2014 Goel et al.
2018/0075408 A1 * 3/2018 Subramanian ... G06Q 10/08345
2022/0156693 A1 * 5/2022 Singh ................. G06Q 30/0205

OTHER PUBLICATIONS

"Optimizing a Time-Sensitive Supply Chain with a Power Function Penalty Cost" Published by Journal of Engineering, project and production management (Year: 2023).*

Zhang, Y., Yuan, C., and Wu, J., "Vehicle Routing Optimization of Instant Distribution Routing Based on Customer Satisfaction," Information 2020, 11, 36; Retrieved from https://doi:10.3390/info11010036 Jan. 9, 2020.

* cited by examiner

*Primary Examiner* — Zeina Elchanti
(74) *Attorney, Agent, or Firm* — FOLEY & LARDNER LLP

(57) ABSTRACT

A system including a processor and a non-transitory computer-readable media storing computing instructions that, when executed on the processor, cause the processor to perform certain operations: identifying a first transit time of a first load that is different from a second transit time of a carrier for the first load; tuning a load generation model using a slackness allowance function; generating, using the load generation model with the slackness allowance function engaged, multiple slackness time windows with corresponding slackness penalties for the first load; and determining a third transit time based on a slackness time window of the multiple slackness time windows and a corresponding slackness penalty for the first load. Other embodiments are disclosed.

20 Claims, 8 Drawing Sheets

805 810 815 820 825 830 835 840 850 860 860 870 875

| | | | | | | | Penalty/ hour | $20 | $5 | $10 | | |
|---|---|---|---|---|---|---|---|---|---|---|---|---|
| Options | Pickup time | Delivery time | Shipment pickup from | Shipment pickup to | Shipment delivery from | Shipment delivery to | Cost | Late Pickup Slack Hours | Early Delivery Slack Hours | Late Delivery Slack Hours | Slack-ness Penalty | Total cost and penalty |
| Option 1 | 2023-12-04 21:59:00-08:00 | 2023-12-12 00:00:00-08:00 | 2023-12-04 00:00:00-08:00 | 2023-12-04 23:58:00-08:00 | 2023-12-14 0:00:01-08:00 | 2023-12-16 23:59:00-08:00 | 300 | 0 | 48 | 0 | $240 | $540 |
| Option 2 | 2023-12-05 21:59:00-08:00 | 2023-12-13 00:00:00-08:00 | 2023-12-04 00:00:00-08:00 | 2023-12-04 23:58:00-08:00 | 2023-12-14 0:00:01-08:00 | 2023-12-16 23:59:00-08:00 | 300 | 22 | 24 | 0 | $560 | $860 |
| Option 3 | 2023-12-06 21:59:00-08:00 | 2023-12-14 00:00:00-08:00 | 2023-12-04 00:00:00-08:00 | 2023-12-04 23:58:00-08:00 | 2023-12-14 0:00:01-08:00 | 2023-12-16 23:59:00-08:00 | 300 | 46 | 0 | 0 | $920 | $1,220 |

FIG. 8

SLACKNESS ALLOCATION FOR LOAD GENERATION

CROSS-REFERENCE TO RELATED APPLICATION

This application claims the benefit of U.S. Provisional Application No. 63/627,493, filed Jan. 31, 2024, which is incorporated herein by reference in its entirety.

TECHNICAL FIELD

This disclosure relates generally to slackness allocation for load generation.

BACKGROUND

An inbound transportation network can include various facilities, such as vendors, distribution centers, center points, etc. The configuration of loads that are shipped within the transportation network, and the routes used for such loads, can affect the overall efficiency and costs of the inbound transportation network.

BRIEF DESCRIPTION OF THE DRAWINGS

To facilitate further description of the embodiments, the following drawings are provided in which:

FIG. 8 illustrates a table showing examples of output options of a third transit time based on multiple slackness time windows and a corresponding slackness penalty.

DETAILED DESCRIPTION

Figure 1:
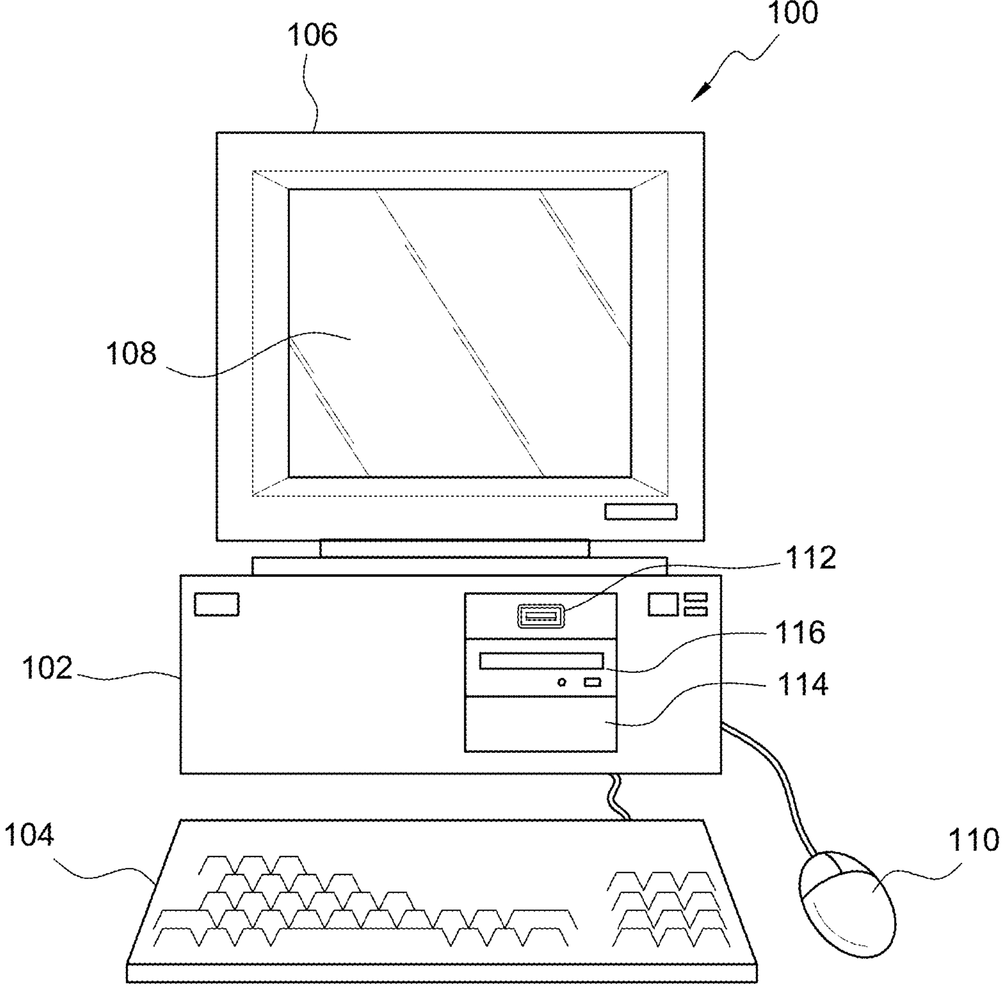
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms “couple,” “coupled,” “couples,” “coupling,” and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. “Electrical coupling” and the like should be broadly understood and include electrical coupling of all types. The absence of the word “removably,” “removable,” and the like near the word “coupled,” and the like does not mean that the coupling, etc. in question is or is not removable.

As defined herein, two or more elements are “integral” if they are comprised of the same piece of material. As defined herein, two or more elements are “non-integral” if each is comprised of a different piece of material.

As defined herein, “approximately” can, in some embodiments, mean within plus or minus ten percent of the stated value. In other embodiments, “approximately” can mean within plus or minus five percent of the stated value. In further embodiments, “approximately” can mean within plus or minus three percent of the stated value. In yet other embodiments, “approximately” can mean within plus or minus one percent of the stated value.

Figure 2:
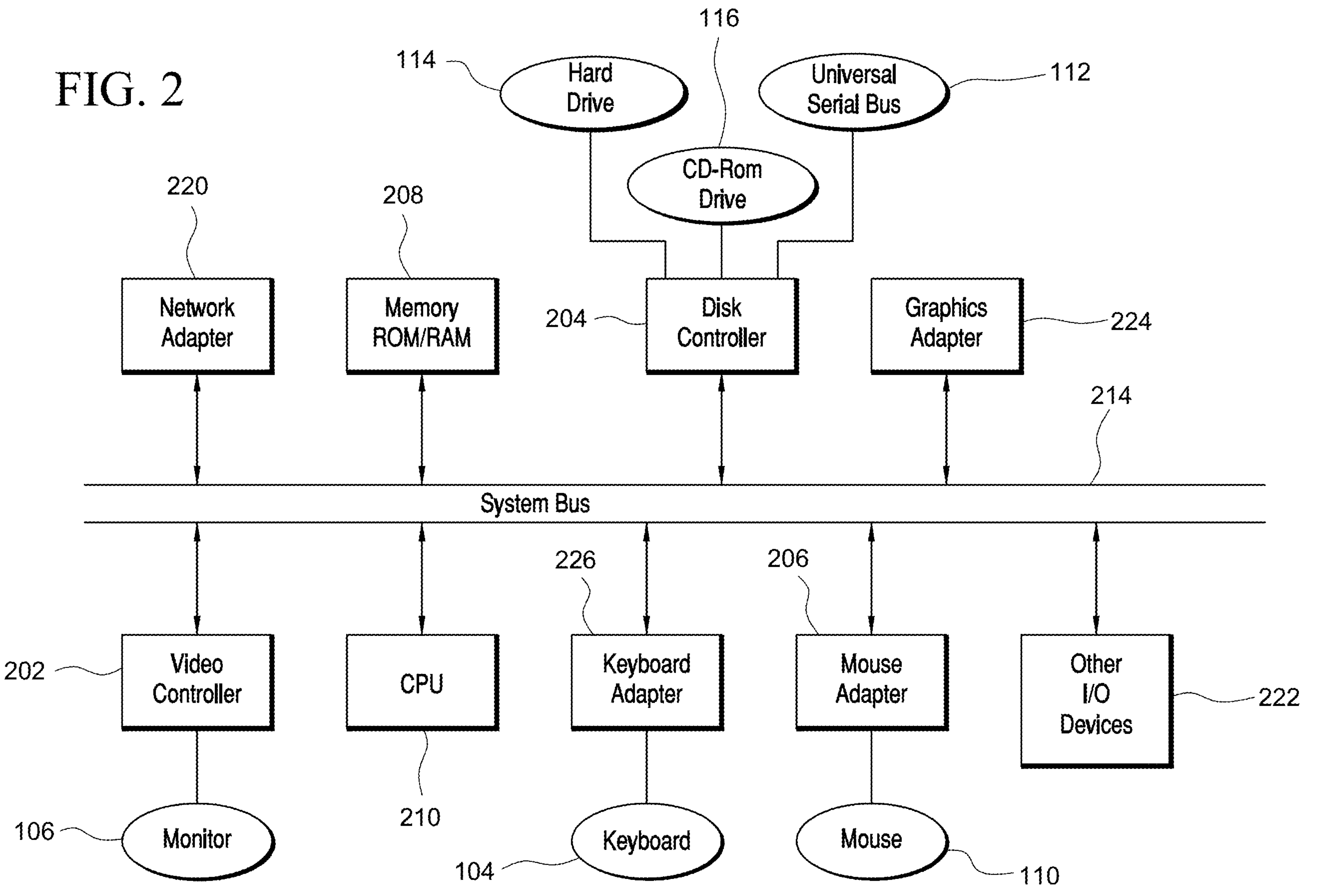
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative activity diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIG. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, U.S. of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, “processor” and/or “processing module” means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
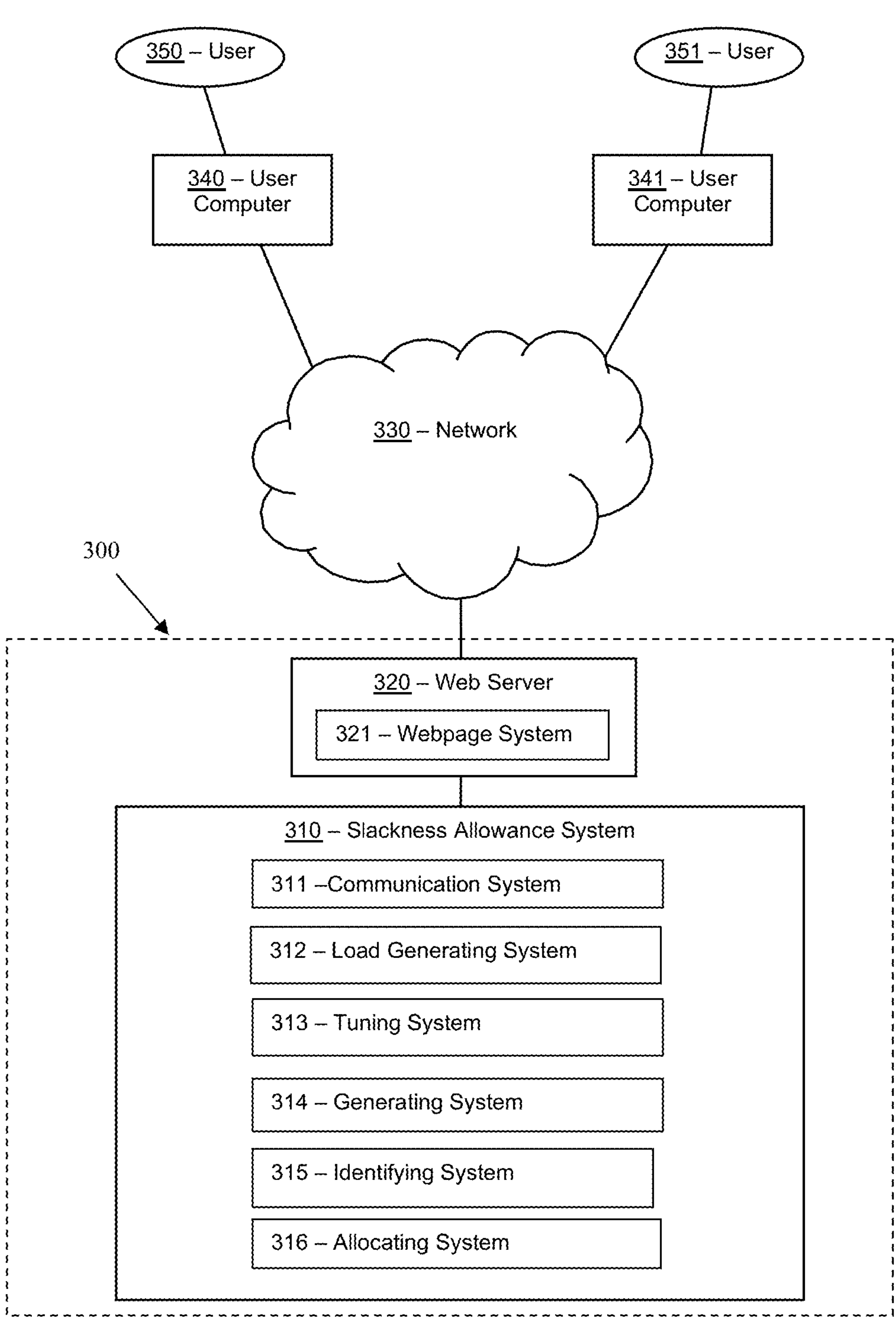
FIG. 3 illustrates a block diagram of a system 300 for performing slackness allocation for load generation.

Turning ahead in the drawings, FIG. 3 illustrates a block diagram of a system 300 for performing slackness allocation for load generation. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a slackness allowance system 310 and/or a web server 320. Slackness allowance system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, slackness allowance system 310 and/or web server 320. Additional details regarding slackness allowance system 310 and/or web server 320 are described herein.

In a number of embodiments, each system of slackness allowance system 310 and/or web server 320 can be a special-purpose computer programed specifically to perform specific functions not associated with a general-purpose computer, as described in greater detail below.

In some embodiments, web server 320 can be in data communication through a network 330 with one or more user computers, such as user computers 340 and/or 341. Network 330 can be a public network, a private network, or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to interface with slackness allowance system 310, such as to generate multiple pickup/delivery day options to enable a user to select an optimal pickup and delivery day based on a transportation cost plus a slackness penalty, in addition to other suitable activities.

In some embodiments, an internal network that is not open to the public can be used for communications between slackness allowance system 310 and/or web server 320 within system 300. Accordingly, in some embodiments, slackness allowance system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, network 330, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, slackness allowance system 310 can include a communication system 311, a load generating system 312, a tuning system 313, a generating system 314, an identifying system 315, and/or an allocating system 316. In many embodiments, the systems of slackness allowance system 310 can be modules of computing instructions (e.g., software modules) stored at non-transitory computer readable media that operate on one or more processors. In other embodiments, the systems of slackness allowance system 310 can be implemented in hardware. Slackness allowance system 310 can be a computer system, such as computer system 100 (FIG. 1), as described above, and can be a single computer, a single server, or a cluster or collection of computers or servers, or a cloud of computers or servers. In another embodiment, a single computer system can host slackness allowance system 310. Additional details regarding slackness allowance system 310 and the components thereof are described herein.

Figure 4:
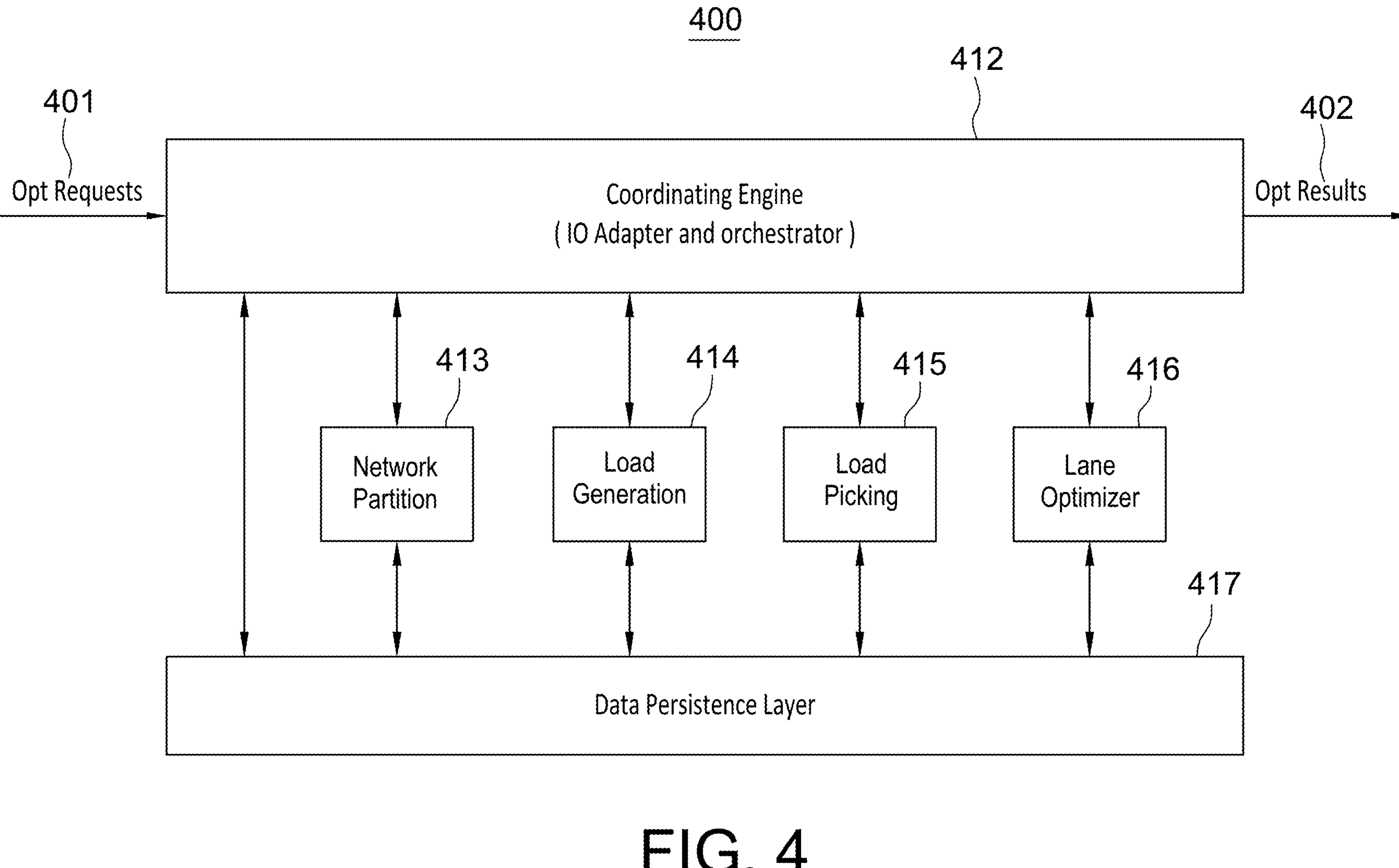
FIG. 4 illustrates a flow chart for processing optimization requests through a central coordinating engine.

Turning ahead in the drawings, FIG. 4 illustrates a block diagram of an architecture 400 of engines 412-416 and data persistence layer 417 for slackness allowance system 310 (FIG. 3). Architecture 400 is merely exemplary, and embodiments of slackness allowance system 310 (FIG. 3) are not limited to architecture 400 presented herein.

As shown in FIG. 4, a central coordinating engine, such as coordinating engine 412, can be an input/output (IO) adapter and orchestrator among the functional engines (e.g., engines 412-416), so that the functional engines can be triggered to process subproblems of an optimization problem for selecting candidate loads. Each functional engine can be triggered a single time or multiple times, and/or can run multiple instances in parallel to solve respective subproblems of the optimization problem directly. In several embodiments, engines 412-416 can interface with data persistence layer 417 to access and/or store data. In many embodiments, data can be stored in data persistence layer 417 between engines. In many embodiments, architecture 400 can make use of cloud computing a parallel processing.

In several embodiments, coordinating engine 412 can receive inputs (e.g., optimization requests 401), output optimization results 402 (e.g., outputs), and/or orchestrate the overall optimization process. In a number of embodiments, coordinating engine 412 can keep track of engine status, such as ready, busy, complete, or failed, of the engines. In other embodiments, communication system 311 (FIG. 3) can be used for IO with slackness allowance system 310 (FIG. 3).

In several embodiments, network partition engine 413 can divide the inbound network (e.g., 500 (FIG. 5)) into several smaller subnetworks to be solved independently by load generation engine 414. In many embodiments, the partitioning scheme used by network partition engine 413 can be data driven.

In several embodiments, load generation engine 414 can generate candidate loads, such as feasible loads and/or loads that meet a threshold level of quality for the subnetworks. For example, shipments can be consolidated as candidate loads. In many embodiments, coordinating engine 412 can trigger multiple instances of load generation engine 414, and each instance of load generation engine 414 can solve a different subnetwork, as generated by network partition engine 413. The number of instances of load generation engine 414 can be scaled on-demand to the number of subnetworks. These instances of the load generation engine 414 can be implemented by distributed process, such as parallel processing across parallel processors. The activities of load generation engine can be similar or identical to U.S. patent application Ser. No. 17/589,030, filed Jan. 31, 2022, titled Load Builder Optimizer Using a Column Generation Engine, which is hereby incorporated by reference in its entirety.

Figure 6:
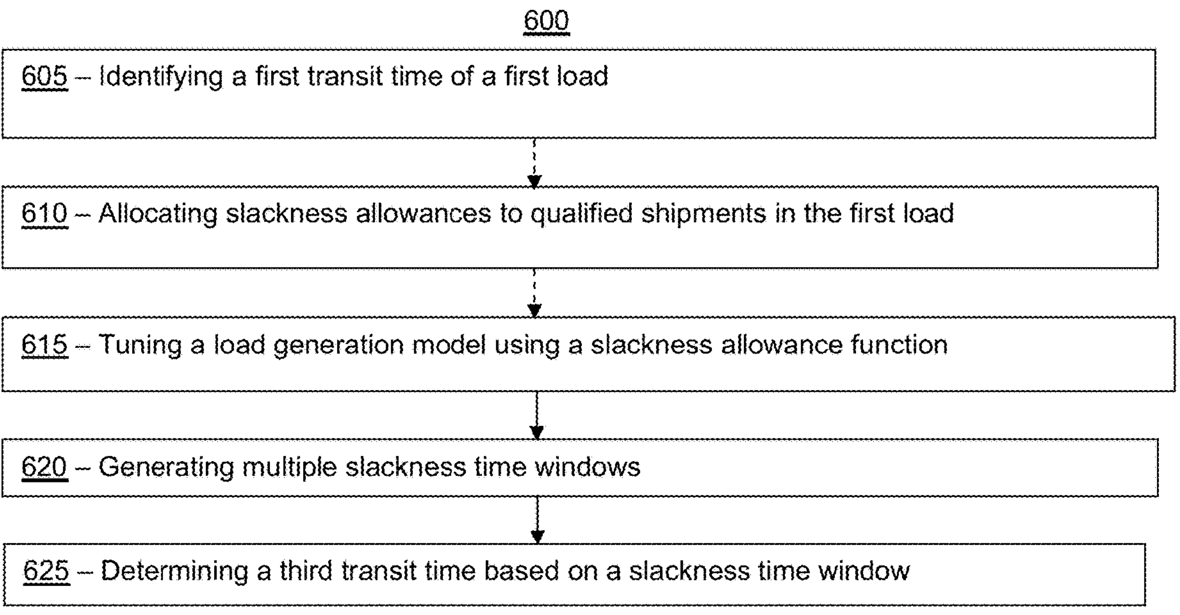
FIG. 6 illustrates a flow chart for a method of performing slackness allocation for load generation, according to another embodiment.

In several embodiments, load picking engine 415 can select the final set of loads to be used from among the combined pool of candidate loads generated from the multiple instances of load generation engine 414. For example, loads can be consolidated across the entire network, and loads can be selected to minimize overall transportation costs. In a number of embodiments, load picking engine 415 can select the final set of loads as shown in method 600 (FIG. 6, described below)

In several embodiments, lane optimizer engine 416 can evaluate alternative carriers applicable to each load selected by load picking engine 415, and can select the most suitable carrier based on business lane constraints for each load.

In many embodiments, data persistence layer 417 can facilitate data sharing to limit data requests between engines and/or limit duplicated requests. In many embodiments, engines can be scaled horizontally for parallel computing, as needed, including across the different types of engines. In many embodiments, the status of an engine can be saved, and the status can be rehydrated, such as copying the same steps from the previous run, such that rerunning of steps can be limited to fails, changes, or updates.

In many embodiments, architecture 400 can solve large-scale optimization problems, and can support solving such optimization problems on the largest transportation networks in the world. In many embodiments, architecture can be implemented with cloud computing, which can leverage automated cloud deployment solutions, such as Kubernetes (which was originally authored by Google, and is now provided by the Cloud Native Computing Foundation), to scale demand. The cloud infrastructure can be utilized to accelerate problem solving in the form of parallel computing.

Many conventional freight planning systems struggle to scale. For example, in some conventional systems, load templates are created, and shipments are assigned to the load templates. The load template creation often limits the possible choices. As another example, in some conventional systems, a strategy is generated to sequence different consolidation behaviors, and shipments are filtered with preconfigured characteristics for each consolidation behavior, which is then collected and compared, which involves extensive user involvement to monitor and handle new or changing scenarios and to add consolidation behavior accordingly to reflect the changed scenario. Both issues involve running steps sequentially, which limits its ability to be deployed in, and take advantage of, a parallel computing or distributed cloud environment.

In many embodiments, the techniques described herein can provide a modularized algorithm scheme to enable combination and reuse of algorithms, which also can be customized for different business units. For example, each of the functional engines (e.g., 412-416) of slackness allowance system 310 can use a modularized algorithm scheme to combine and reuse algorithmic solvers. In many embodiments, the algorithmic solvers can be scaled vertically and/or horizontally.

Turning ahead in the drawings, FIG. 6 illustrates a flow chart for a method 600, according to another embodiment. In some embodiments, method 600 can be a method of performing slackness allocation for load generation. In many embodiments, method 600 also can consolidate shipments into larger loads to reduce transportation costs and improve supply chain efficiency. Method 600 is merely exemplary and is not limited to the embodiments presented herein. Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as slackness allowance system 310 and/or web server 320. The processor(s) can be similar or identical to the processor(s) described above with respect to computer system 100 (FIG. 1).

Referring to FIG. 6, method 600 can include an activity 605 of identifying a first transit time of a first load that is different from a second transit time of a carrier for the first load. In some embodiments, activity 605 can include determining infeasible shipments with load planning routes that are outside of a pickup and/or delivery window. As an example, an infeasible shipment can include shipments with transit times for pickup and/or delivery windows that are incompatible or that do not match a transit time for pickup and/or delivery of a carrier. In various embodiments, the term a load, a shipment, an order, and/or shipment orders can be used interchangeably to describe items being picked up from an origin destination using a carrier and delivered to a final destination.

In some embodiments, upon identifying that the first transit time of the first load is incompatible with the second transit time, method 600 also can include an activity 610 of allocating slackness allowances to qualified shipments in the first load. In several embodiments, identifying qualified shipments that need slackness allowances can be based on user defined preferences that can define a shipment as being qualified for generating loads using slackness allowances. In several embodiments, a first transit time can include a pre-defined pickup/delivery time for each shipment and a second transit time can include pickup/delivery times defined by a carrier to transport the same load and/or shipment. In many embodiments, determining how much slackness allowance to add to a load can be based on whether a pickup and/or a delivery location is customized by a user preference, such as a vendor or facility.

In some embodiments, activity 605 can evaluate carriers available for each respective pickup and delivery location to compare the defined transit times of each carrier with a duration range between respective pickup and delivery time windows. When the defined transit times of a carrier is within the duration range of the pre-defined pickup and delivery time windows, a route and load plan can be generated using load generation engine 414 without engaging the slackness function. For example, shipment 1 has a pickup time window of [Jan. 1, 2024, Jan. 4, 2024] and a delivery time window of [Jan. 6, 2024, Jan. 7, 2024]. In this example, the minimal transit time is 2 days (=the gap between Jan. 4, 2024 and Jan. 6, 2024) and the maximal transit time can be 6 days (=the gap between Jan. 1, 2024 and Jan. 7, 2024). Thus, in this example a duration range between the pickup and delivery time windows is [2 days, 6 days]. If a carrier defined transit time is 5 transit days to move shipment 1 from the pickup location to the delivery location, then shipment 1 is compatible with the carrier transit time for the pickup/delivery time windows. If the carrier defined transit time is 10 transit days to move shipment 1 from the pickup location to the delivery location, then shipment 1 is a qualified shipment where generating a route and load plan using load generation engine 414 with the slackness function engaged to a slackness to make the shipment routable.

Further to the example, without adding slackness, shipment 1 is otherwise unrouteable (e.g., infeasible to transport) unless the load generation engine 414 is implemented with the slackness function conditioned on whether or not a user allows a maximum of 10 days for a late delivery time by updating the delivery time window to [Jan. 6, 2024, Jan. 17, 2024] for shipment 1. Thus, the updated duration range for shipment 1 becomes a pickup time and slacked delivery time windows of [2 days, 16 days], thus the carrier with 10 transit days can transport shipment 1 from its origin location (e.g., vendor location) to a destination (e.g., distribution center) at the expense of a penalty cost for the slacked delivery time windows.

In various embodiments, activity 610 can include obtaining the qualified shipments that can be based on shipments with at least one of (i) a transit time exceeding a threshold, (ii) assigned to a primary carrier outside of a preference of a user, or (iii) assigned to a secondary carrier other than the primary carrier exceeding the transit time. Some examples of qualified shipments can include shipments that cannot be routed on any mode of transportation and/or a carrier due to insufficient or excessive transit time, shipments that cannot be routed on a user specified mode of transportation due to a transit time issue, shipments that are routable on back up carriers rather than primary carriers due to fixed transit time windows, or shipments that are routable on primary carriers however co-primary carriers in another transit mode have transit time issues.

In several embodiments, after load generation engine 414 with slackness allowances outputs a group of shipments with slacked time windows and corresponding slackness penalties, activity 610 can include conducting time feasibility checks on slacked time windows for each shipment to determine whether or not bundling respective shipments together onto into a single carrier is time feasible. In various embodiments, evaluating time feasibility using slacked pickup/delivery time windows can include using the original pre-defined pickup/delivery time window to measure the actual slackness being utilized. In several embodiments, measuring the actual slackness utilized can include multiplying the associated slackness penalty rate with the slack hours and adding the calculated total penalty to the total transportation cost. For example, shipment 1 is a qualified shipment, thus included multiple days with delivery options and corresponding penalties to select. Shipment 2 with pre-defined pickup time window as [Jan. 2, 2024, Jan. 5, 2024] and delivery time window as [Jan. 11, 2024, Jan. 14, 2024] is not a qualified shipment as shipment 2 has a duration range between pickup and delivery time windows of [6 days, 10 days] and the carrier has a 10 day transit time for shipment 2. In the scenario where both shipments 1 & 2 are bundled into the same carrier, activity 610 can include examining the time feasibility of this carrier load to determine a common pickup time window of [Jan. 2, 2024, Jan. 4, 2024] by (i) taking the overlapped days of pickup time windows for both shipments and (ii) finding a common delivery time window of [Jan. 11, 2024, Jan. 14, 2024]. In various embodiments, activity 610 can utilize the overlapped days of the slacked delivery time window of shipment 1 and the pre-defined delivery time window of shipment 2 to determine a duration range between the common pickup/delivery time window becomes [7 days, 12 days]. Thus, the carrier with 10 days transit is feasible to transport this bundled or consolidated load. For example, if the consolidated load is picked up on Jan. 2, 2024, it can be delivered on Jan. 12, 2024 where the slackness penalty for shipment 1 is 5 days of late delivery slackness: penalty for late delivery slackness is $100 per day multiplied by 5 days for a slackness penalty of $500. Similarly, if the consolidated load is pickup on Jan. 4, 2024, the consolidate load can be delivered on Jan. 14, 2024, for a slackness penalty of $700 based on 7 days of late delivery slackness. In various embodiments, the activities of 610 can be illustrated further in connection with FIG. 8.

Figure 7:
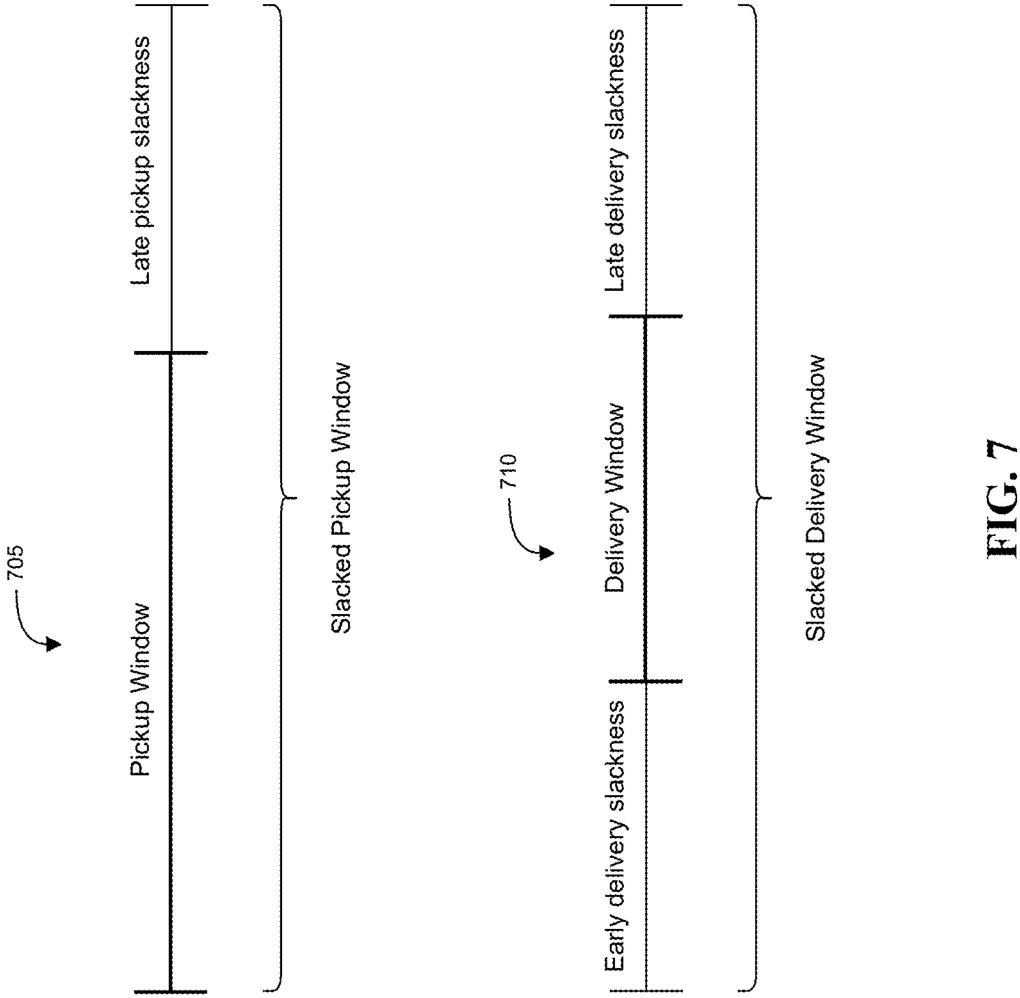
FIG. 7 illustrates example timelines, showing how applying slackness can advantageously extend a pickup and/or delivery window opportunity that can make unrouteable shipments routable.

In some embodiments, activity 610 can include obtaining slackness allowances including a maximum number of slack hours allowable for (i) a late pickup, (ii) an early delivery, or (iii) a late delivery. In several embodiments, early pickup time windows are fixed thus, activity 610 can exclude slackness allowances for early pickup time windows. In various embodiments, obtaining slackness allowances can extend the original pickup or delivery windows based on how much slackness can be applied to each shipment. FIG. 7 shows how applying slackness can advantageously extend a pickup and/or delivery window opportunity that can make unrouteable shipments routable. In this example, a slacked pickup window 705 illustrates how a fixed pickup window at a vendor's location can be extended by adding a range of time based on late pickup slack hours per the time window constraints at the vendor location limits. In another example, a slacked delivery window 710 illustrates how a fixed delivery window at a facility can be extended by adding a range of time based on early delivery slack hours and/or late delivery slack hours per the facility constraints at the facility location.

Turning back to FIG. 6, method 600 further can include an activity 615 of tuning a load generation model using a slackness allowance function.

In various embodiments, load generation engine 414 (FIG. 4) can output fixed pickup and delivery times for a load without violating vendor or facility constraints. In several embodiments, upon identifying a qualified shipment, method 600 can transmit computing instructions to pause or halt implementing the load generation engine 414 (FIG. 4) long enough to turn on or engage a slackness allowance function to work in tandem with the load generating engine 414 (FIG. 4) modifying the computer functions of the load generation engine 414 (FIG. 4) before generating multiple extended pickup and/or delivery time windows for a load. In various embodiments, method 600 allows the load generation engine 414 (FIG. 4) with the slackness allowance function engaged to be triggered to process each subproblem of the fixed pickup and/or delivery windows options that otherwise can leave one or more shipments unrouteable without the extended pickup and/or delivery window options that violated vendor and/or facility constraints as the expense of a penalty.

In some embodiments, using a slackness algorithm can target infeasible shipments for load planning outside of the pickup and/or delivery time window constraints by providing a buffer to a fixed time window or generating flexible time windows at the expense of incurring a penalty.

Figure 5:
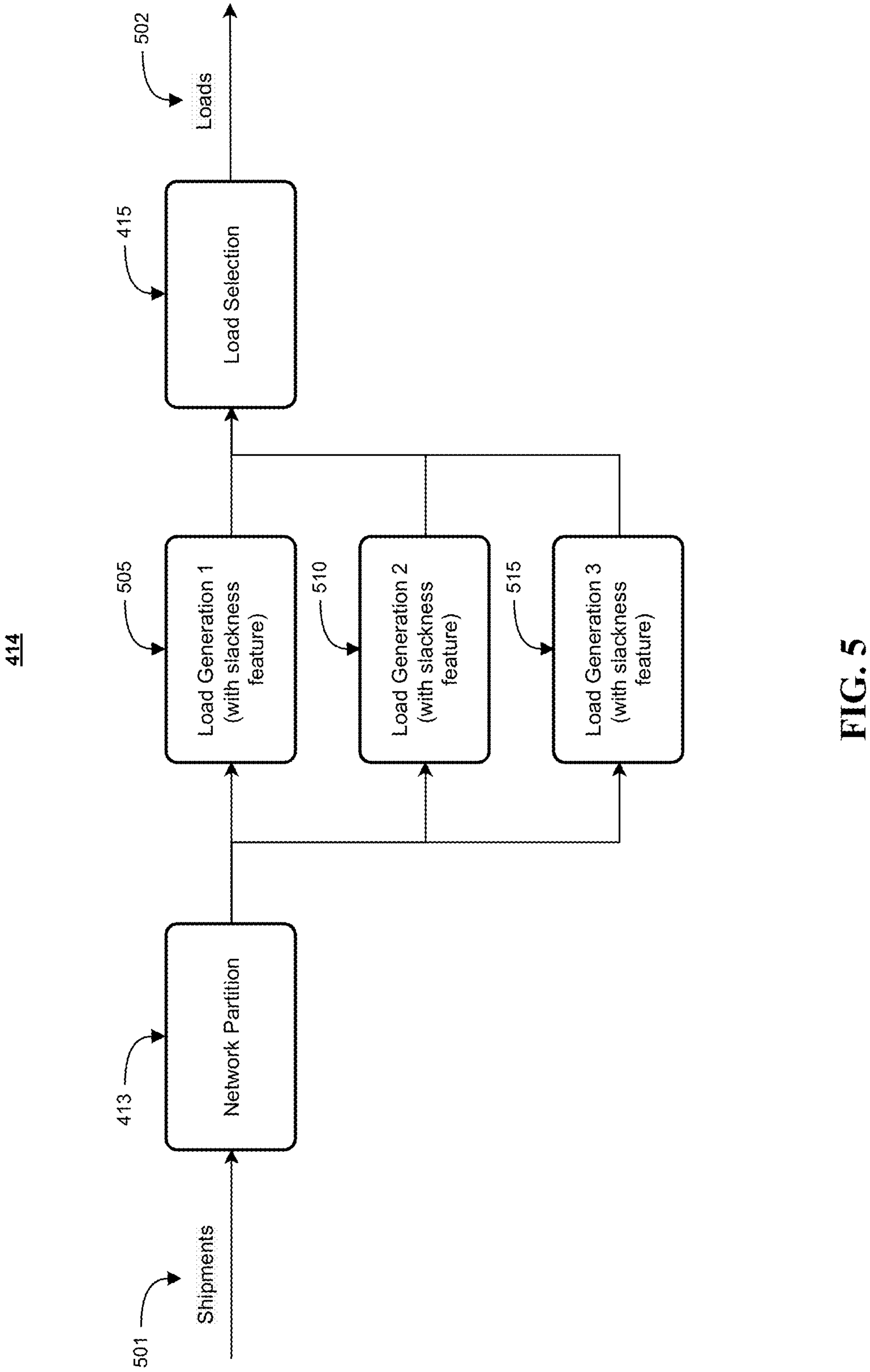
FIG. 5 illustrates a flow chart for using a load generation engine by engaging a slackness function.

FIG. 5 illustrates an improvement using load generation engine 414 (FIG. 4) by engaging a slackness function (e.g., slackness feature) 505 as part of the load generation engine 414 (FIG. 4), prior to generating multiple pickup and delivery day options for qualified shipments. FIG. 5 includes inputs 501 and outputs 502. In several embodiments, inputs 501 and outputs 502 can be similar or identical to the inputs (e.g., optimization requests 401) (FIG. 4) and output optimization results 402 (e.g., outputs) (FIG. 4). FIG. 5 further illustrates how load generation engine 414 (FIG. 4) can generate the multiple options with multiple slackness functions 505, 510, and 515 engaged by using multiple threads that can be run in consecutively or concurrently.

Returning to FIG. 6, activity 615 can include obtaining the slackness allowance function based on slackness allowance thresholds.

In various embodiments, method 600 also can include an activity 620 of generating, using the load generation model with the slackness allowance function engaged, multiple slackness time windows with corresponding slackness penalties for the first load.

In some embodiments, activity 620 can include running time feasibility checks for the multiple slackness time windows when the allowance function is engaged. In various embodiments, during time feasibility checks, using wider slacked time windows for pickup and/or delivery windows can add flexibility to shipments being routed. As another example, generating loads with slackness change unrouteable shipments to routable shipments and primary carriers can be utilized for shipments over backup carriers based on flexible transit times.

In some embodiments, activity 620 can include determining whether a shipment with slackness allowances is a candidate for a consolidation to be shipped using an alternate route based on time feasibility checks.

In a number of embodiments, activity 620 can include obtaining the consolidation of the shipment based on available carrier fill rate constraints.

In various embodiments, activity 620 can include obtaining corresponding slackness penalty is determined based on a predetermined unit rate of hours of slackness. In several embodiments, shipments with slackness allowances can be consolidated to other existing loads to increase the fill rate of a carrier thus, the additional shipments add little to no additional transportation cost for the load. For example, carrier loads that have a 60% fill rate can add 40% more shipments for the same cost of transportation during that route, thus shipments with slackness allowances can ride for free.

In some embodiments, activity 620 can include obtaining the corresponding slackness penalty that can be further determined based on at least one of: each late pickup slack hour used, each early delivery slack hour used, or each late delivery slack hour used.

In some embodiments, activity 620 can be based on flow path, such as (i) direct freight flow from vendor to the distribution center, using truckload, intermodal, or rail mode; (ii) consolidation freight flow from vendor to center point to distribution center, using truckload, intermodal, or rail mode; (iii) LTL (less than truckload) freight mode from vendor to distribution center; or (iv) SMPK freight mode from vendor to distribution center. For example, slackness can be applied to one or more flow paths, while not applying slackness to other flow paths.

In several embodiments, method 600 further can include an activity 625 of determining a third transit time based on a slackness time window of the multiple slackness time windows and a corresponding slackness penalty for the first load. In many embodiments, each of the multiple pickup and/or delivery options with slackness allowances can include a slack hour time range of one the slackness allowance options to enable the user to select an optimal pickup and/or delivery time with the transportation cost plus a slackness penalty. In various embodiments, a slackness penalty can be a zero cost where the total transportation cost is unmodified.

Turning ahead in the drawing, FIG. 8 shows examples of output options of a third transit time based on multiple slackness time windows and a corresponding slackness penalty. FIG. 8 illustrates, using a table format, an exemplary output for each added slackness time window with penalty based on the type of slack hours added to the transportation cost. In some embodiments, the table format used in FIG. 8 can include a number of columns, such as options 805 output by the load generator engaged with the slackness function corresponding to a load plan, calculated pickup time ranges 810 based on vendor time window availability without violating vendor time constraints corresponding to each option of multiple options, calculated delivery times ranges 815 based on vendor time window availability without violating facility time constraints corresponding to each option of multiple options, pre-defined pickup times ranges 820 from a vendor location based on extended vendor time window availability and violating time constraints corresponding to each option of multiple options, pre-defined pickup times ranges 825 to a facility location based on extended facility time window availability and violating time constraints corresponding to each option of multiple options, pre-defined delivery times ranges 830 from facility location based on extended vendor time window availability and violating time constraints corresponding to each option of multiple options, pre-defined delivery times ranges 835 from a facility location based on extended vendor time window availability and violating time constraints corresponding to each option of multiple options, transportation costs 840 without adding slack hours where the transportation cost is a fixed cost based on the load plan, a unit rate and late pickup slack hours 850 of a penalty configured to be multiplied by each number of slack hours as estimated when a late pickup time window is added during the load generation process with the slack allowance engaged (e.g., the unit rate can be $20 per hour for each slack hour added corresponding to a late pickup at the location of a vendor based on vendor time constraints, or each option can output more than one type of slack allowance and slack hours corresponding to a respective extended slack hours for pickup and/or delivery time windows), a unit rate and early delivery slack hours 860 of a penalty configured to be multiplied by each number of slack hours as estimated when an early delivery to a facility time window is added during the load generation process with the slack allowance engaged (e.g., the unit rate can be $5 per hour for each slack hour added corresponding to the early delivery time window at the location of the facility based on facility time constraints), a unit rate and late delivery slack hours 865 of a penalty configured to be multiplied by each number of slack hours as estimated when a late delivery to a facility time window is added during the load generation process with the slack allowance engaged (e.g., the unit rate can be $10 per hour for each slack hour added corresponding to the late delivery time window at the location of the facility based on facility time constraints), slackness penalties 870 for each option by multiplying a respective slackness penalty by the number slack hours for each slack allowance type (e.g., option 1 calculates a time range of 48 slack hours for an early delivery slack allowance that amount to 48 hours multiplied by the unit rate of $5 per hour for a slackness penalty of $240 to be added to the transportation cost of the route and load for pickup and delivery), and respective total costs and penalties 875 of the transporting the load based on the corresponding pickup and delivery time windows for option 1.

In several embodiments, FIG. 8 can include calculated pick time ranges 810 can include a pickup start time at the vendor, that can be outside of pre-defined pickup/delivery time windows. In some embodiments, calculated delivery times ranges 815 can include a delivery end time at a destination facility, that can be outside of the pre-defined delivery time window. In various embodiments, FIG. 8 can include pre-defined pickup times ranges 820 can include a pre-defined pickup time window start. pre-defined pickup times ranges 825 can include pre-defined pickup time window end, pre-defined delivery times ranges 830 can include pre-defined delivery time window start, and/or pre-defined delivery times ranges 835 can include pre-defined delivery time window end.

In several examples, the total cost is calculated by adding the fixed transportation cost 840 and a respective penalty cost for a total cost of the transportation corresponding to each option output by the load generator with slackness function engaged. For example, the total cost for option 3 is $1,220 which is the sum of the transportation cost 840 of $300 plus the slackness penalty 870 of $920 corresponding to the extended time windows for option 3. As another example, while selecting a third transit time can be based on minimizing a load's total transportation cost by opting for a flexible extension of time, selecting the optimal time window can be based on a user's preference of carriers, transit time, delivery times windows and/or another transportation reason where optimal the total cost of transportation can be a cost larger than the smallest total cost output in as an option.

Returning to FIG. 3, communication system 311 can at least partially perform activity 615 (FIG. 6) of tuning a load generation model using a slackness allowance function.

In many embodiments, load generating system 312 can at least partially perform activity 625 (FIG. 6) of determining a third transit time based on a slackness time window of the multiple slackness time windows and a corresponding slackness penalty for the first load.

In some embodiments, tuning system 313 can at least partially perform activity 615 (FIG. 6) of tuning a load generation model using a slackness allowance function.

In several embodiments, generating system 314 can at least partially perform activity 620 (FIG. 6) of generating, using the load generation model with the slackness allowance function engaged, multiple slackness time windows with corresponding slackness penalties for the first load.

In various embodiments, identifying system 315 can at least partially perform activity 605 (FIG. 6) of identifying a first transit time of a first load that is different from a second transit time of a carrier for the first load, and/or activity 620 (FIG. 6) of generating, using the load generation model with the slackness allowance function engaged, multiple slackness time windows with corresponding slackness penalties for the first load.

In some embodiments, allocating system 316 can at least partially perform activity 610 (FIG. 6) of allocating slackness allowances to qualified shipments in the first load.

In several embodiments, web server 320 can include a webpage system 321. Webpage system 321 can at least partially perform sending instructions to user computers (e.g., 340-341 (FIG. 3)) based on information received from communication system 311.

In many embodiments, the techniques described herein can be used continuously at a scale that cannot be handled using manual techniques.

In a number of embodiments, the techniques described herein can solve a technical problem that arises only within the realm of computer networks, as determining whether to engage a slackness allowance function prior to running a shipment through a load generator to output flexible pickup and/or delivery dates violating time constraints at the expense of adding a penalty corresponding to a number of slack hours estimated for a respective slack allowance time, does not exist outside the realm of computer networks. Moreover, the techniques described herein can solve a technical problem that cannot be solved outside the context of computer networks. Specifically, the techniques described herein cannot be used outside the context of computer networks, in view of a lack of data that is part of the techniques described herein would not exist.

Various embodiments can include a system including a processor and a non-transitory computer-readable media storing computing instructions that, when executed on the processor, cause the processor to perform certain operations. The operations can include identifying a first transit time of a first load that is different from a second transit time of a carrier for the first load. The operations also can include tuning a load generation model using a slackness allowance function. The operations further can include generating, using the load generation model with the slackness allowance function engaged, multiple slackness time windows with corresponding slackness penalties for the first load. The operations also can include determining a third transit time based on a slackness time window of the multiple slackness time windows and a corresponding slackness penalty for the first load.

A number of embodiments can include a computer-implemented method. The method can include identifying a first transit time of a first load that is different from a second transit time of a carrier for the first load. The method also can include tuning a load generation model using a slackness allowance function. The method further can include generating, using the load generation model with the slackness allowance function engaged, multiple slackness time windows with corresponding slackness penalties for the first load. The method also can include determining a third transit time based on a slackness time window of the multiple slackness time windows and a corresponding slackness penalty for the first load.

Additional embodiments can include a non-transitory computer-readable media storing computing instructions that, when executed on a processor, cause the processor to perform certain operations. The operations can include identifying a first transit time of a first load that is different from a second transit time of a carrier for the first load. The operations also can include tuning a load generation model using a slackness allowance function. The operations further can include generating, using the load generation model with the slackness allowance function engaged, multiple slackness time windows with corresponding slackness penalties for the first load. The operations also can include determining a third transit time based on a slackness time window of the multiple slackness time windows and a corresponding slackness penalty for the first load.

Although performing slackness allocation for load generation has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders. As another example, performing communication system 311, load generating system 312, tuning system 313, generating system 314, identifying system 315, allocating system 316, and/or webserver 320, (see FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising a processor and a non-transitory computer-readable medium storing computing instructions that, when executed on the processor, cause the processor to perform operations comprising:

triggering, by a coordinating engine that is configured to interface with a data persistence layer and using parallel processing across one or more processors, multiple instances of a load generation engine configured to interface with the data persistence layer, wherein an instance, of the multiple instances of the load generation engine, is configured to solve a corresponding subnetwork of a plurality of subnetworks;

identifying, using at least the instance of the multiple instances of the load generation engine and based on the coordinating engine using the parallel processing across the one or more processors to trigger the multiple instances of the load generation engine, a first transit time of a first load that is different from a second transit time of a carrier for the first load;

tuning, using at least the instance of the multiple instances of the load generation engine, a load generation model with a slackness allowance function based on the coordinating engine using the parallel processing across the one or more processors to trigger the multiple instances of the load generation engine and based on the data persistence layer storing one or more of data from the multiple instances of the load generation engine; and generating, based on the multiple instances of the load generation engine executing in parallel and using the load generation model with the slackness allowance function engaged, multiple slackness time windows with corresponding slackness penalties for the first load to determine a third transit time based on a slackness time window of the multiple slackness time windows and a corresponding slackness penalty for the first load.

2. The system of claim 1, wherein the operations further comprise:

upon identifying that the first transit time of the first load is incompatible with the second transit time, allocating slackness allowances to qualified shipments in the first load.

3. The system of claim 2, wherein the qualified shipments are based on shipments with at least one of (i) a transit time exceeding a threshold, (ii) assigned to a primary carrier outside of a preference of a user, or (iii) assigned to a secondary carrier other than the primary carrier exceeding the transit time.

4. The system of claim 3, wherein the slackness allowances comprise a maximum number of slack hours allowable for (i) a late pickup, (ii) an early delivery, or (iii) a late delivery.

5. The system of claim 1, wherein the slackness allowance function is based on slackness allowance thresholds.

6. The system of claim 1, wherein generating the multiple slackness time windows comprises:

running time feasibility checks for the multiple slackness time windows when the slackness allowance function is engaged.

7. The system of claim 6, wherein generating the multiple slackness time windows comprises:

determining whether a shipment with slackness allowances is a candidate for a consolidation to be shipped using an alternate route based on time feasibility checks.

8. The system of claim 7, wherein the consolidation of the shipment is based on available carrier fill rate constraints.

9. The system of claim 1, wherein the corresponding slackness penalty is determined based on a predetermined unit rate of hours of slackness.

10. The system of claim 9, wherein the corresponding slackness penalty is further determined based on at least one of:

each late pickup slack hour used;
each early delivery slack hour used; or
each late delivery slack hour used.

11. A computer-implemented method comprising:

triggering, by a coordinating engine that is configured to interface with a data persistence layer and using parallel processing across one or more processors, multiple instances of a load generation engine configured to interface with the data persistence layer;

identifying, using at least an instance of the multiple instances of the load generation engine and after the coordinating engine uses the parallel processing across the one or more processors to trigger the multiple instances of the load generation engine, a first transit time of a first load that is different from a second transit time of a carrier for the first load;

tuning a load generation model using a slackness allowance function; and generating, using the load generation model with the slackness allowance function engaged, based on the coordinating engine using the parallel processing across the one or more processors to trigger the multiple instances of the load generation engine, and based on the data persistence layer storing one or more of data associated with the multiple instances of the load generation engine, multiple slackness time windows with corresponding slackness penalties for the first load to determine a third transit time based on a slackness time window of the multiple slackness time windows and a corresponding slackness penalty for the first load.

12. The computer-implemented method of claim 11, further comprising:

upon identifying that the first transit time of the first load is incompatible with the second transit time, allocating slackness allowances to qualified shipments in the first load.

13. The computer-implemented method of claim 12, wherein the qualified shipments are based on shipments with at least one of (i) a transit time exceeding a threshold, (ii) assigned to a primary carrier outside of a preference of a user, or (iii) assigned to a secondary carrier other than the primary carrier exceeding the transit time.

14. The computer-implemented method of claim 13, wherein the slackness allowances comprise a maximum number of slack hours allowable for (i) a late pickup, (ii) an early delivery, or (iii) a late delivery.

15. The computer-implemented method of claim 11, wherein the slackness allowance function is based on slackness allowance thresholds.

16. The computer-implemented method of claim 11, wherein generating the multiple slackness time windows comprises:

running time feasibility checks for the multiple slackness time windows when the slackness allowance function is engaged.

17. The computer-implemented method of claim 16, wherein generating the multiple slackness time windows further comprises:

determining whether a shipment with slackness allowances is a candidate for a consolidation to be shipped using an alternate route based on time feasibility checks.

18. The computer-implemented method of claim 17, wherein the consolidation of the shipment is based on available carrier fill rate constraints.

19. A non-transitory computer-readable medium storing computing instructions that, when executed on a processor, cause the processor to perform operations comprising:

triggering, by a coordinating engine that is configured to interface with a data persistence layer and using parallel processing across one or more processors, multiple instances of a load generation engine configured to interface with the data persistence layer;

identifying, using at least an instance of the multiple instances of the load generation engine and based on the coordinating engine using the parallel processing across the one or more processors to trigger the multiple instances of the load generation engine, a first transit time of a first load that is different from a second transit time of a carrier for the first load;

tuning, using at least the instance of the multiple instances of the load generation engine, a load generation model with a slackness allowance function based on the coordinating engine using the parallel processing across the one or more processors to trigger the multiple instances of the load generation engine; and generating, based on the multiple instances of the load generation engine executing in parallel and using the load generation model with the slackness allowance function engaged, multiple slackness time windows with corresponding slackness penalties for the first load to determine a third transit time based on a slackness time window of the multiple slackness time windows and a corresponding slackness penalty for the first load.

20. The non-transitory computer-readable medium of claim 19, wherein the operations further comprise:

upon identifying that the first transit time of the first load is incompatible with the second transit time, allocating slackness allowances to qualified shipments in the first load.

* * * * *